US012670050B2

(12) United States Patent
Prabhakar et al.

(10) Patent No.: US 12,670,050 B2
(45) Date of Patent: Jun. 30, 2026

(54) DEVICE ADMINISTRATION WITH PUBLIC KEY INFRASTRUCTURE

(71) Applicant: Arista Networks, Inc., Santa Clara, CA (US)

(72) Inventors: Krishna Prabhakar, Los Altos Hills, CA (US); Rajarao Bhagya Prasad Nittur, Milpitas, CA (US); Mohit Goyal, Redwood City, CA (US); Anoop Kumaran Nair, Thrikkakara (IN); Rajesh Kumar Ganapathy Achari, Perumbavoor (IN)

(73) Assignee: Arista Networks, Inc., Santa Clara, CA (US)

( * ) Notice: Subject to any disclaimer, the term of this patent is extended or adjusted under 35 U.S.C. 154(b) by 35 days.

(21) Appl. No.: 18/674,292

(22) Filed: May 24, 2024

(65) Prior Publication Data

US 2024/0413982 A1 Dec. 12, 2024

(30) Foreign Application Priority Data

Jun. 12, 2023 (IN) .............................. 202341039926

(51) Int. Cl.
| | |
|---|---|
| *H04L 9/08* | (2006.01) |
| *G06F 11/07* | (2006.01) |
| *G06F 11/22* | (2006.01) |
| *G06F 16/242* | (2019.01) |
| *G06F 16/245* | (2019.01) |
| *G06F 40/295* | (2020.01) |
| *G06F 40/40* | (2020.01) |
| *G06N 5/022* | (2023.01) |
| *H04L 9/40* | (2022.01) |
| *H04L 41/0806* | (2022.01) |
| *H04L 41/0893* | (2022.01) |
| *H04L 41/0894* | (2022.01) |
(Continued)

(52) U.S. Cl.
CPC ........ *G06F 11/0709* (2013.01); *G06F 11/079* (2013.01); *G06F 11/0793* (2013.01); *G06F 11/2257* (2013.01); *G06F 16/242* (2019.01); *G06F 16/245* (2019.01); *G06F 40/295* (2020.01); *G06F 40/40* (2020.01); *G06N 5/022* (2013.01); *H04L 9/0825* (2013.01); *H04L 41/0806* (2013.01); *H04L 41/0893* (2013.01); *H04L 41/0894* (2022.05); *H04L 41/0895* (2022.05); *H04L 41/145* (2013.01); *H04L 41/149* (2022.05); *H04L 41/28* (2013.01); *H04L 43/0876* (2013.01); *H04L 63/0823* (2013.01); *H04L 63/083* (2013.01); *H04L 63/0876* (2013.01); *H04L 63/10* (2013.01); *H04L 63/102* (2013.01)

(58) Field of Classification Search
None
See application file for complete search history.

(56) References Cited

U.S. PATENT DOCUMENTS

2004/0268142 A1* 12/2004 Karjala ............... H04L 63/0272
726/15
2005/0154875 A1* 7/2005 Chao ..................... G06F 21/445
713/156

* cited by examiner

*Primary Examiner* — William J. Goodchild
(74) *Attorney, Agent, or Firm* — Treyz Law Group, P.C.; Tianyi He

(57) ABSTRACT

A device access management server may facilitate secure access of a target device by an accessing device. The secure remote access of the target device by the accessing device may be facilitated by a public key infrastructure (PKI) certificate issued and/or validated by the device access management server.

20 Claims, 8 Drawing Sheets

(51) Int. Cl.
    *H04L 41/0895*     (2022.01)
    *H04L 41/14*       (2022.01)
    *H04L 41/149*     (2022.01)
    *H04L 41/28*       (2022.01)
    *H04L 43/0876*    (2022.01)

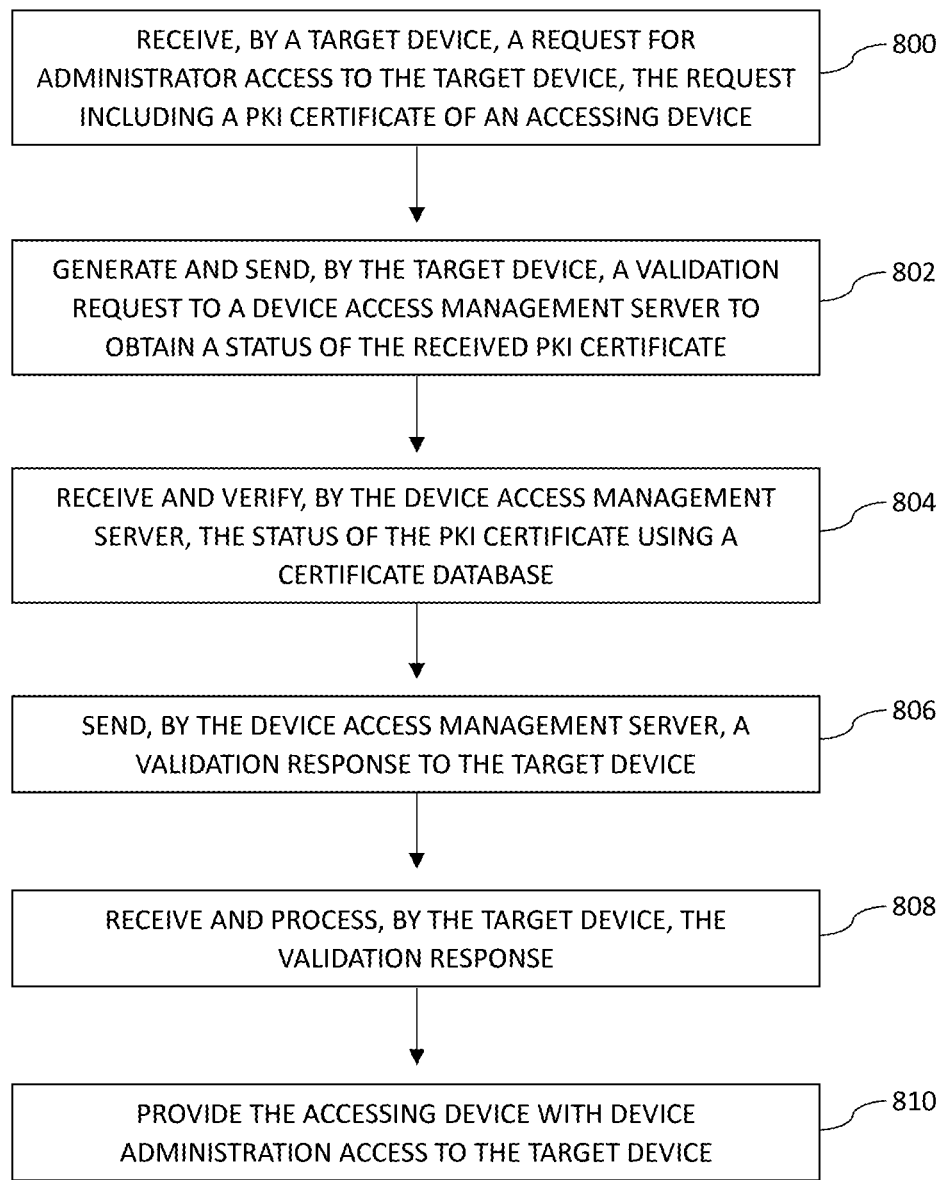

RECEIVE, BY A TARGET DEVICE, A REQUEST FOR ADMINISTRATOR ACCESS TO THE TARGET DEVICE, THE REQUEST INCLUDING A PKI CERTIFICATE OF AN ACCESSING DEVICE ⌐ 800

GENERATE AND SEND, BY THE TARGET DEVICE, A VALIDATION REQUEST TO A DEVICE ACCESS MANAGEMENT SERVER TO OBTAIN A STATUS OF THE RECEIVED PKI CERTIFICATE ⌐ 802

RECEIVE AND VERIFY, BY THE DEVICE ACCESS MANAGEMENT SERVER, THE STATUS OF THE PKI CERTIFICATE USING A CERTIFICATE DATABASE ⌐ 804

SEND, BY THE DEVICE ACCESS MANAGEMENT SERVER, A VALIDATION RESPONSE TO THE TARGET DEVICE ⌐ 806

RECEIVE AND PROCESS, BY THE TARGET DEVICE, THE VALIDATION RESPONSE ⌐ 808

PROVIDE THE ACCESSING DEVICE WITH DEVICE ADMINISTRATION ACCESS TO THE TARGET DEVICE ⌐ 810

FIG. 8

DEVICE ADMINISTRATION WITH PUBLIC KEY INFRASTRUCTURE

This application claims the benefit of Indian provisional patent application No. 202341039926, filed Jun. 12, 2023, which is hereby incorporated by reference herein in its entirety.

BACKGROUND

This generally relates to a communication system configured to facilitate secure access of a remote target device by an accessing device.

In one illustrative communication system, a network can include network devices that convey network traffic. It may be desirable for a user such as a network administrator operating a computing device to remotely access one or more of the network devices in the network in a secure manner, e.g., to perform device administration.

BRIEF DESCRIPTION OF THE DRAWINGS

FIG. 8 is a flowchart of illustrative operations for validating a certificate to provide an accessing device with device administration access in accordance with some embodiments.

DETAILED DESCRIPTION

Figure 1:
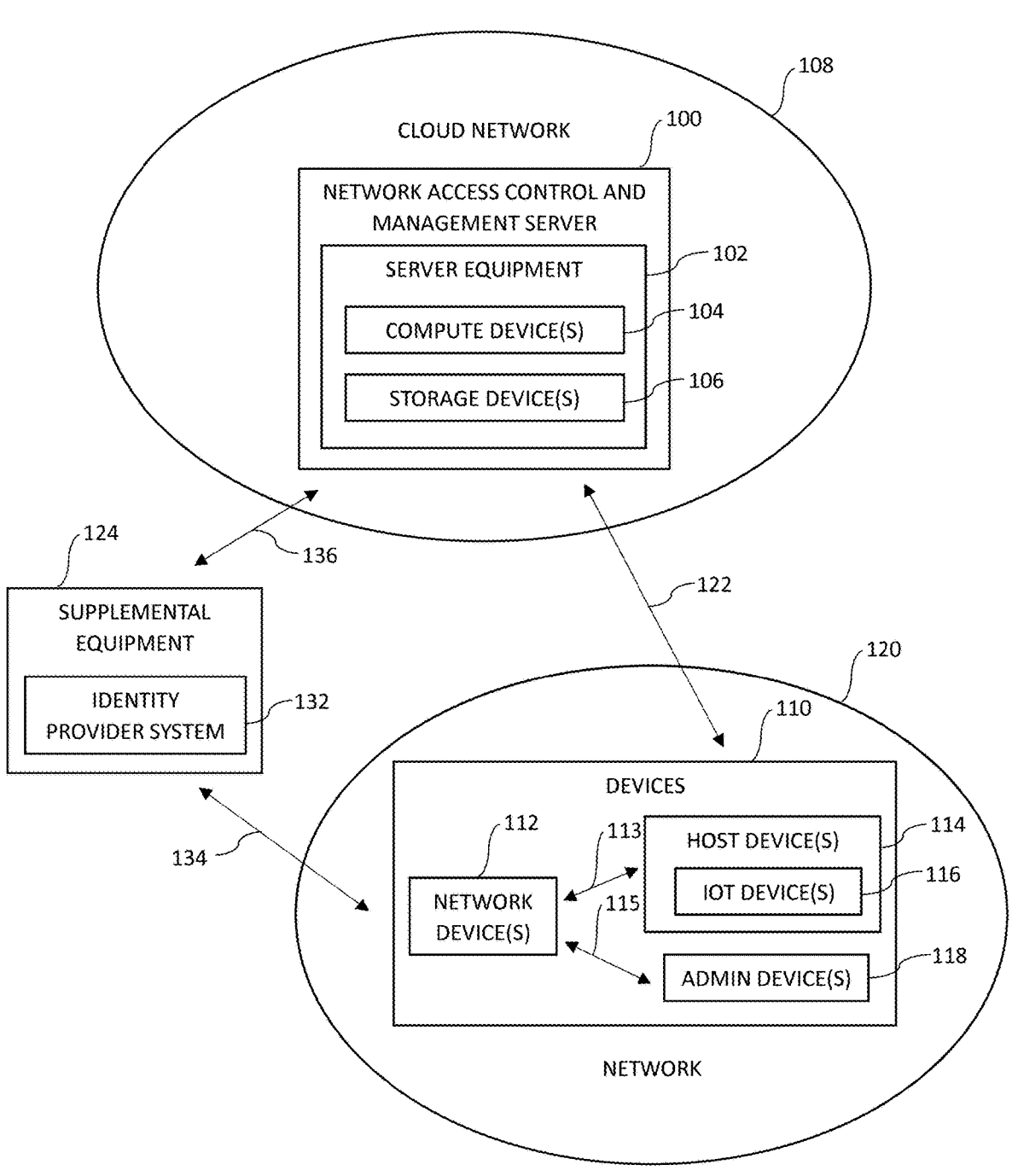
FIG. 1 is a diagram of an illustrative system for facilitating secure remote device access in accordance with some embodiments.

A network can convey network traffic, e.g., in the form of frames, packets, etc., between hosts. The hosts may be coupled to intervening network devices of the network that forward the network traffic. Such a networking system can include a mechanism by which at least some of the devices of the network (e.g., network devices, certain types of host devices, etc.) are remotely accessible by network administrators or other authorized users for performing device administration functions (e.g., device management, device configuration, receiving device operational information, etc.). However, the manner in which administrator computing devices gain remote access to these devices can be complex and/or non-intuitive, e.g., to administrators without certain knowledge. In other instances, simplistic schemes to remotely access devices may compromise network security. Accordingly, it may be desirable to provide an intuitive yet secure mechanism by which administrator devices can gain remote access to the devices of a network.

In some illustrative configurations described herein as illustrative examples, a networking system may include a device access management server that facilitates access of a target device by an accessing device for device administration. The accessing device, such as a computing device operable by a network administrator, may implement a user interface, receive user input, and provide user output. The user interface may provide a device administration portal through which the device access management server facilitates access to the target device.

In particular, the device access management server may implement (e.g., provide) one or more public key infrastructure (PKI) services that generate, distribute, maintain, and/or validate user identity certificates (e.g., PKI certificates containing user identity information). In particular, an accessing device may provide user login credentials to verify a user identity and, upon successful user identity verification, may receive a certificate corresponding to the user identity from the device access management server and may store the certificate locally to facilitate administrative access of a target device. When desired (e.g., based on corresponding user input), the accessing device may request access to a target device at least in part by providing the locally stored certificate to the target device (e.g., with the device access management server serving as a proxy for the request). Upon receiving the request, the target device may exchange messages with the device access management server to validate the received certificate in the request. Upon successful validation of the certificate by the device access management server, the target device may grant administrative access to the accessing device. Accordingly, the accessing device may perform device administration of the target device (e.g., via the device access management server).

Requests for administrative access to the same target device or even to different target devices from an accessing device can cach include and be authorized based on the certificate, thereby providing a password-less approach that is more secure. The device access management server may further simplify (e.g., automate) at least some portions of this device administration process, e.g., by distributing the certificate to a location on the accessing device for storage such that when the accessing device requests access to a target device, the device access management server may automatically obtain the certificate from the location to populate the request, by handling certificate management and validation, by interfacing with an identity provider system, etc. With this approach, a simplified yet secure process for facilitating target device access for device administration can be provided.

The contexts and/or advantages described above are merely illustrative. If desired, any suitable system may employ the mechanism(s) described above and/or further detailed herein to improve the mechanism(s) by which target devices are accessed by accessing devices (e.g., impart the above-mentioned advantages and/or other advantages). An illustrative networking system in which the above-mentioned mechanism for facilitating remote access of a target device by an accessing device may be implemented is shown in FIG. 1.

FIG. 1 is a diagram of an illustrative networking system that includes a server such as server 100. Server 100 may be formed from server equipment 102 containing any suitable number of compute devices 104 and any suitable number of storage devices 106.

As an example, server equipment 102 may include server hardware such as blade servers, rack servers, and/or tower servers. Configurations in which server equipment 102 includes rack servers mounted to racks of a server chassis or enclosure are sometimes described herein as an illustrative example. Each of compute devices 104 and/or storage devices 106 may be provided as part of the server hardware (e.g., as part of the rack servers).

Compute devices 104 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as field programmable gate array (FPGA) devices, based on application specific system processors (ASSPs), based on application-specific integrated circuit (ASIC) processors, and/or based on other processor architectures. Storage devices 106 may include volatile memory such as dynamic random-access memory, static random-access memory, etc., non-volatile memory such as hard-drive storage, solid-state storage, flash memory, etc., removable memory, and/or other types of memory circuitry.

More specifically, storage devices 106 may include one or more non-transitory (tangible) computer readable storage media that store the operating system software and/or any other software code, sometimes referred to as program instructions, software, data, instructions, or code. Compute devices 104 may run (e.g., execute) an operating system and/or other software/firmware that is stored on storage devices 106 to perform the desired operations of server 100 (e.g., the operations as described herein). In such a manner, server equipment 102 may implement one or more services, one or more applications (e.g., cach containing one or more services), one or more software servers, and/or other software features to collectively perform the functions of network access control and/or network management for server 100. As described herein, server 100 refers to the underlying server (hardware) equipment and/or the server software (e.g., services and/or applications) executed thereon to perform the operations of server 100.

As just a few illustrative examples, server 100 may be configured to provide network policy reception, definition, and enforcement (e.g., reception, definition, and enforcement of segmentation policy and/or security policy via virtual local area networks (VLANs), access control lists (ACLs), vendor-specific attributes (VSAs), and/or other policy-defining features), natural language query, processing, and response (e.g., a chat interface for outputting network information and network configuration assistance and recommendation based on user natural language input), network-connected device profiling (e.g., the gathering, storage, and analysis of network-connected device information to facilitate network policy recommendations and/or other network configuration recommendations), predictive failure event handling (e.g., prediction and handling of future expected (yet-to-occur) failure events associated with server infrastructure and/or network configuration), network authentication (e.g., authentication for user and/or user device(s) connected to the network), public key infrastructure (PKI) (e.g., includes a certificate authority, a certificate issuance service, a certification validation and/or status lookup service, a certificate database, etc.), interfacing and integration services with external applications and/or servers (e.g., to obtain network and/or user information from external equipment and distribute network and/or user information to external equipment), and device and/or user onboarding (e.g., registration and storage of user and/or user device information).

In general, server 100 may perform any suitable functions for network access control and network management. Configurations in which server 100 facilitates secure remote access of a target device such as a network device by an accessing device (e.g., by implementing the functions described herein in connection with server 300 in FIG. 3) are sometimes described herein as an illustrative example. In other words, server 300 as described herein may be formed from at least part of server 100. Server equipment 102 (e.g., compute device(s) 104 and storage device(s) 106) implementing server 100 may perform the operations described in connection with server 300 instead of or in addition to any of the other illustrative functions as described in the examples above.

In the example of FIG. 1, server 100 may be implemented as a part of a network such as cloud network 108 (e.g., a datacenter network). Cloud network 108 may include one or more network devices such as switches (e.g., single-layer switches, multi-layer switches, etc.), routers, gateways, bridges, hubs, repeaters, firewalls, wireless access points, devices serving other networking functions, devices that include a combination of these functions, or other types of network devices. Multiple such network devices (e.g., of different types or having different functions) may be present in cloud network 108 and interconnected therebetween and with other network devices to form a cloud network that forwards traffic to and from different portions of server 100 (e.g., different compute and/or storage devices of server equipment 102) serving as end hosts of cloud network 108.

Configurations in which server 100 is implemented on public cloud infrastructure (e.g., cloud network 108 is a public cloud network) are sometimes described herein as an illustrative example. If desired, server 100 may be implemented on a private cloud network or an on-premise network (e.g., an on-premise datacenter network).

Server 100 may communicate with (client) devices 110 of network 120 such as network devices 112, host devices 114 (e.g., Internet-of-Things (IOT) devices 116 such as network-connected appliances or devices such as cameras, thermostats, wireless sensors, medical or health sensors which are sometimes referred to as Internet-of-Medical-Things (IOMT) devices, or other sensors, lighting fixtures, speakers, printers, or other output devices, controllers or other input devices, and other network-connected equipment that serve as input-output devices and/or computing devices in a distributed networking system). Devices 110 of network 120 may also include one or more network administrator devices 118 (e.g., a computing device operated by a network administrator or a user with network administrator privileges to perform configuration and administration of network devices 112). If desired, a device 118 may serve as an end host of network 120 or may simply connect to network device(s) 112 for device administration without necessarily being an end host of network 120.

In some arrangements described herein as an illustrative example, communication between server 100 and at least some (end) host devices 114 may occur via network devices 112 and links 113 (e.g., network devices 112 may forward network traffic between server 100 and host devices 114 to facilitate communication therebetween). Devices 110 may form part of network 120 for which server 100 provides the above-mentioned functions (e.g., facilitation of secure remote access of a target device such as a network device by an accessing device, public key infrastructure (PKI) services, network access control and management functions, interfacing and integration services with external applications and/or servers, device and/or user onboarding, etc.).

Host devices 114 may serve as end hosts of network 120 connected to each other and/or connected to other end hosts of other networks (e.g., server 100 of cloud network 108) via network devices 112 using communication paths 113. Administrator devices 118 may perform network administration for network devices 112 and/or other devices. Other types of user devices may serve as end host devices 114. Network devices 112 may include switches (e.g., single-layer switches, multi-layer switches, etc.), routers, gateways, bridges, hubs, repeaters, firewalls, wireless access points, devices serving other networking functions, devices that include a combination of these functions, or other types of network devices.

Server 100 may provide network access control and network management services for network 120 by communicating with devices 110 via communication paths 122. To facilitate network access control and network management, server 100 may communicate with other supplemental equipment 124 (e.g., other servers implemented on server equipment similarly containing compute(s) and/or storage device(s)). Supplemental equipment 124 may sometimes be referred to as external equipment 124 when implemented on equipment external to server equipment 102 on which server 100 is implemented. Configurations in which server 100 communicates with one or more systems or platforms that provide additional contextual information for network 120, the users of network 120, and/or devices 110 on network 120 such as an identity provider system or platform 132 are sometimes described herein as an illustrative example. System 132 may be implemented using one or more servers to execute one or more services that provide user identity authentication, supply user contextual information such as user role or identity information, and/or supply other types of user and user device information (e.g., services provided as part of a single sign-on (SSO) provider platform).

If desired, supplemental equipment 124 may include network management and network device management system(s) such as a wireless access point provisioning and management system (e.g., a wireless access point management server), a network switch provisioning and management system (e.g., a network switch management server), and/or other network device management equipment that communicate with network devices 112 (e.g., to supply provisioning and/or configuration data, to receive network performance metrics data, and/or to exchange other suitable information), may include network analysis system(s) such as servers and/or services that provide analysis of network performance by way of providing endpoint visibility and security analysis (e.g., based on network traffic to and/or from host devices 114), and/or may include other systems or platforms that interact with server 100 and/or devices 110.

Supplemental equipment 124 may communicate with components of network 120 (e.g., network devices 112 and host devices 114) to supply provisioning, configuration, and/or control data, to receive network, device, and/or user information, and/or to otherwise exchange information therebetween via communication paths 134. Supplemental equipment 124 may communicate with server 100 (e.g., different portions of server equipment 102) to transmit the received network, device, and/or user information, to receive network access control and/or management information, and/or to otherwise exchange information therebetween via communications paths 136.

Configurations in which identity provider system 132 provides a cloud-based platform (e.g., includes services and/or applications executing on server equipment of the same type(s) as described in connection with server equipment 102) are sometimes described herein as illustrative examples. In these examples, equipment 124 (e.g., system 132) may be implemented within the same cloud network as or different cloud networks than server 100. If desired, one or more systems of supplemental equipment 124 may be implemented locally (e.g., local to network 120) instead of as a cloud application (e.g., implemented on cloud-based server equipment) or may be implemented in other desired manners.

The networking system in FIG. 1 (e.g., the combination of cloud network 108, network 120, and equipment 124) may span any suitable scope (e.g., may span an overall network of any suitable scope) depending on the implementations of server 100, devices 110, and/or supplemental equipment 124. Communication paths 122, 134, and 136 may be implemented according to the scope of the networking system. Configurations in which one or more (e.g., all) of communication paths 122, 134, and 136 include the Internet are sometimes described herein as an illustrative example. In particular, any of communications paths 122, 134, and 136 may implement communication (e.g., exchanges messages in the form of frames, packets, etc.) based on a secure Hypertext Transfer Protocol (e.g., Hypertext Transfer Protocol Secure (HTTPS)), a Remote Authentication Dial-In User Service (RADIUS) protocol (e.g., a RADIUS protocol with Transport Layer Security (TLS) encryption sometimes referred to as a RadSec protocol or another type of secure RADIUS protocol), and/or other secure protocols for establishing and communicating using the corresponding communications paths, as just a few examples.

Figure 2:
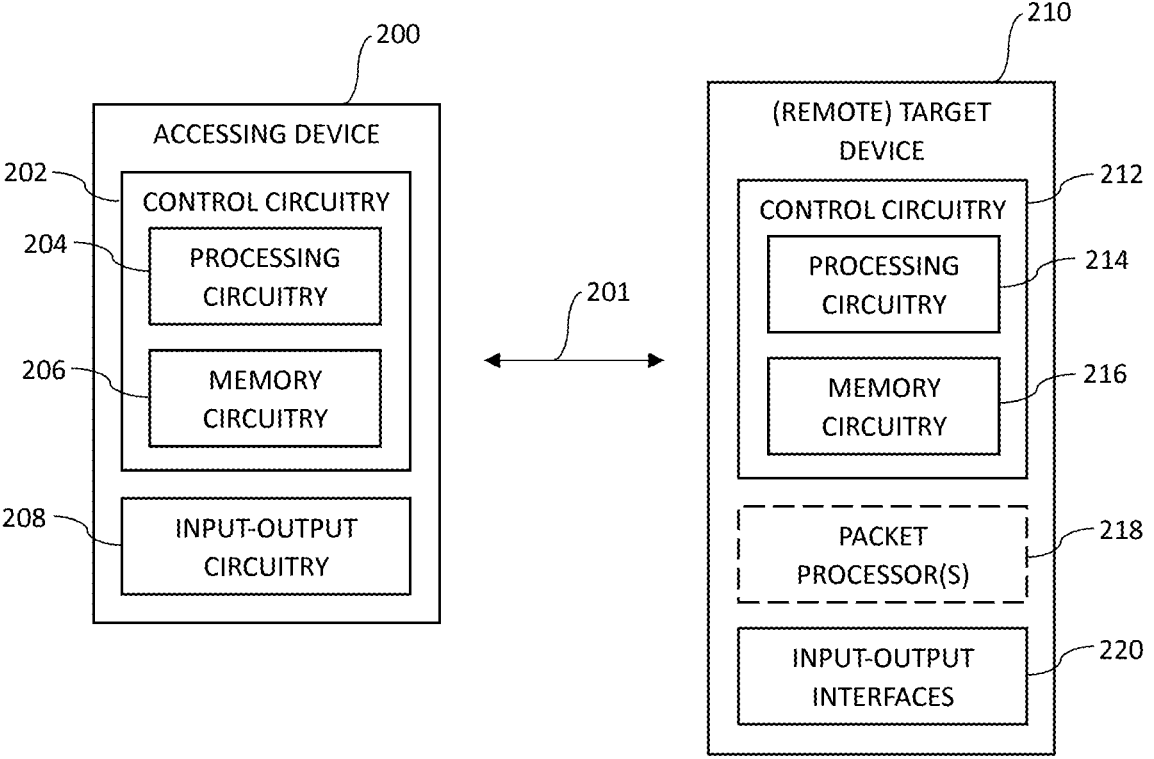
FIG. 2 is a diagram of an illustrative accessing device communicatively coupled to an illustrative target device in accordance with some embodiments.

In order to administer and/or manage devices within a networking system, these devices may be configured to support remote access. In particular, a first device (sometimes referred to herein as an accessing device) may gain access to a second device (sometimes referred to herein as a target device). This may allow a user (e.g., a network administrator) operating the first device to remotely provide input to and/or remotely receive output from the second device. FIG. 2 is a diagram of an illustrative accessing device communicatively coupled to a target device.

As shown in FIG. 2, an accessing device such as device 200 may access a target device such as device 210 by establishing a secure communication session (e.g., over one or more communication paths 201). In some illustrative arrangements sometimes described herein as an example, accessing device 200 may use the secure communication session to perform device administration of target device 210. As examples, device 200 may use the secure communication session to supply device 210 with configuration data, control signals, and/or other networking information, to receive output such as performance metrics, log information, and/or other operational data from device 210, and/or to otherwise communicate with device 210 in order to perform other networking functions. Configurations in which the secure communication session is established through an intervening entity (e.g., a proxy service provided by server 100 in FIG. 1, by server 300 in FIG. 3, by server 300 in FIG. 5, etc.) are sometimes described herein as an illustrative example. If desired, other remote access protocols (e.g., a Secure Shell (SSH) protocol, remote login protocols, remote file transfer protocols, etc.) may be used to establish a communication session between accessing device 200 and target device 210.

In the example of FIG. 2, accessing device 200 may be a computing device that includes control circuitry 202 with processing circuitry 204 and memory circuitry 206 and that includes input-output circuitry 208, among other components. Processing circuitry 204 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on architectures.

Processing circuitry 204 may run (e.g., execute) a computing device operating system and/or other software/firmware that is stored on memory circuitry 206. Memory circuitry 206 may include one or more non-transitory (tangible) computer-readable storage media that stores the operating system software and/or any other software code, sometimes referred to as program instructions, software instructions, software, data, instructions, or code. As examples, the operations performed by device 200 to access target device 210 as described herein may be stored as (software) instructions on the one or more non-transitory computer-readable storage media (e.g., in portion(s) of memory circuitry 206 in device 200). The corresponding processing circuitry (e.g., one or more processors of processing circuitry 204 in device 200) may process or execute the respective instructions to perform the operations for accessing target device 210.

Memory circuitry 206 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 200), and/or other storage circuitry. Processing circuitry 204 and memory circuitry 206 as described above may sometimes be referred to collectively as control circuitry 202 for device 200. Control circuitry 202 of device 200 may control the operation of other components such as components of input-output circuitry 208 (e.g., by outputting signals, commands, data, etc., to these components based on processing received signals, commands, data, etc.).

Input-output circuitry 208 may include one or more input-output devices configured to implement one or more user interfaces with which a user (e.g., a network administrator) can interact with device 200, e.g., by receiving user input and/or supplying the user with output (user output). As examples, these one or more input-output devices may include one or more displays (e.g., an integrated display or an external monitor, a touchscreen display, a touch-insensitive display, etc.), other types of light-emitting devices, an integrated or external keyboard, an integrated or external touchpad or trackpad, a mouse, other types of keys, buttons, or wheels, and/or any other devices configured to receive user input and/or supply user output.

Input-output circuitry 208 may include interface circuitry through which internal components (e.g., processing circuitry 204, memory circuitry 206, etc.) may interface and communicate with external equipment such as one or more servers, one or more target devices, and/or one or more external input-output devices. As examples, the interface circuitry may include physical ports (e.g., in which external connectors coupled to external equipment are received to facilitate communication therebetween), may include wire-less communication circuitry (e.g., antennas, transceivers, radios, etc.) to facilitate communicative coupling to external equipment, may include encoders and/or decoders (e.g., circuits that encode/decode data for conveyance across wired and/or wireless mediums), and/or may include other types of interface circuitry. While the interface circuitry is described as part of input-output circuitry 208, which is shown as being separate from processing circuitry 204, this is merely illustrative. If desired, some portions of the interface circuitry (e.g., at least circuitry that perform higher-level functions such as implementing a graphical user interface for display) may be implemented by (portions of) processing circuitry 204.

Device 200 may be implemented as any suitable type of computing device or equipment. As examples, device 200 may be a desktop computer, a laptop computer, a tablet computer, a smartphone, server-based (computing) equipment, a network controller or other type of network management device, or other types of computing devices. Configurations in which device 200 is a computing device operable by a network administrator such as an administrator device 118 in FIG. 1 are sometimes described herein as an illustrative example. Device 200 may sometimes be referred to herein as a user device (with the network administrator as the user).

In the example of FIG. 2, target device 210 may include control circuitry 212 having processing circuitry 214 and memory circuitry 216, one or more packet processors 218, and input-output interfaces 220 (e.g., network interfaces). Processing circuitry 212 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on architectures.

Processing circuitry 214 may run (e.g., execute) an operating system and/or other software/firmware that is stored on memory circuitry 216. Memory circuitry 216 may include one or more non-transitory (tangible) computer-readable storage media that stores the operating system software and/or any other software code, sometimes referred to as program instructions, software instructions, software, data, instructions, or code. As examples, the operations for supporting remote access of target device 210 as described herein may be stored as (software) instructions on the one or more non-transitory computer-readable storage media (e.g., in portion(s) of memory circuitry 216 in device 210). The corresponding processing circuitry (e.g., one or more processors of processing circuitry 214) may process or execute the respective instructions to perform the operations for supporting remote access of target device 210.

Memory circuitry 216 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 210), and/or other storage circuitry. Processing circuitry 214 and memory circuitry 216 as described above may sometimes be referred to collectively as control circuitry 212 (e.g., implementing a control plane of target device 210 when implemented as a network device). Control circuitry 212 of device 210 may control the operation of other components such as one or more packet processors 218 and/or input-output interfaces 220 (e.g., by outputting signals, commands, data, etc., to these components based on processing received signals, commands, data, etc.).

In some illustrative configurations described herein as an example, target device 210 may be a network device. In at least some of these configurations, target device 210 may include one or more packet processors 218. Packet processor(s) 218 may be used to implement a data plane or forwarding plane of device 210. Packet processor(s) 218 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 218 may receive incoming network traffic via input-output interfaces 220, parse and analyze the network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 216 and/or other memory circuitry integrated as part of or separate from packet processor 218.

Input-output interfaces 220 may include different types of communication interfaces such as Ethernet interfaces (e.g., formed from one or more Ethernet ports), optical interfaces, Bluetooth interfaces, Wi-Fi interfaces, and/or other network interfaces for connecting device 210 to the Internet, a local area network, a wide area network, a mobile network, generally other network device(s) in these networks, and/or other computing equipment (e.g., host equipment such as server equipment, user devices, etc.). As an example, some input-output interfaces 220 (e.g., those based on wired communication) may be implemented on physical ports. These physical ports may be configured to physically couple to and/or electrically connect to corresponding mating connectors of external components or equipment. Different ports may have different form-factors to accommodate different cables, different modules, different devices, or generally different external equipment. As another example, some input-output interfaces 220 (e.g., those based on wireless communication) may be implemented using wireless communication circuitry (e.g., antennas, transceivers, radios, etc.).

In configurations in which target device 210 is a network device, processing circuitry 214 may execute network device control plane software such as operating system software, routing policy management software, routing protocol agents or processes, routing and/or forwarding information base agents, and other control software, may be used to support the operation of protocol clients and/or servers (e.g., to form some or all of a communications protocol stack such as the TCP/IP stack), may be used to support the operation of packet processor(s) 218, may store packet forwarding information, may execute packet processing software, and/or may execute other software instructions that control the functions of device 210 and the other components therein.

As examples, when target device 210 is a network device, device 210 may be or include a switch (e.g., single-layer (L2) switches and/or multi-layer (L2 and L3) switches), a bridge, a router, a gateway, a hub, a repeater, a firewall, a wireless access point, another type of network device serving other networking functions, a network device that includes the functionality of two or more of these devices, a management (controller) device that control the operation of one or more other network devices, and/or other types of network devices. Configurations in which device 210 is a network device such as a network device 112 in FIG. 1 are sometimes described herein as an illustrative example.

In some instances, accessing device 200 may be on a local network (portion) while target device 210 may be on a remote network (portion) relative to the local network (portion) of accessing device 200. Accordingly, target device 210 may sometimes be referred to as remote target device 210 and accessing device 200 may remotely access target device 210.

Figure 3:
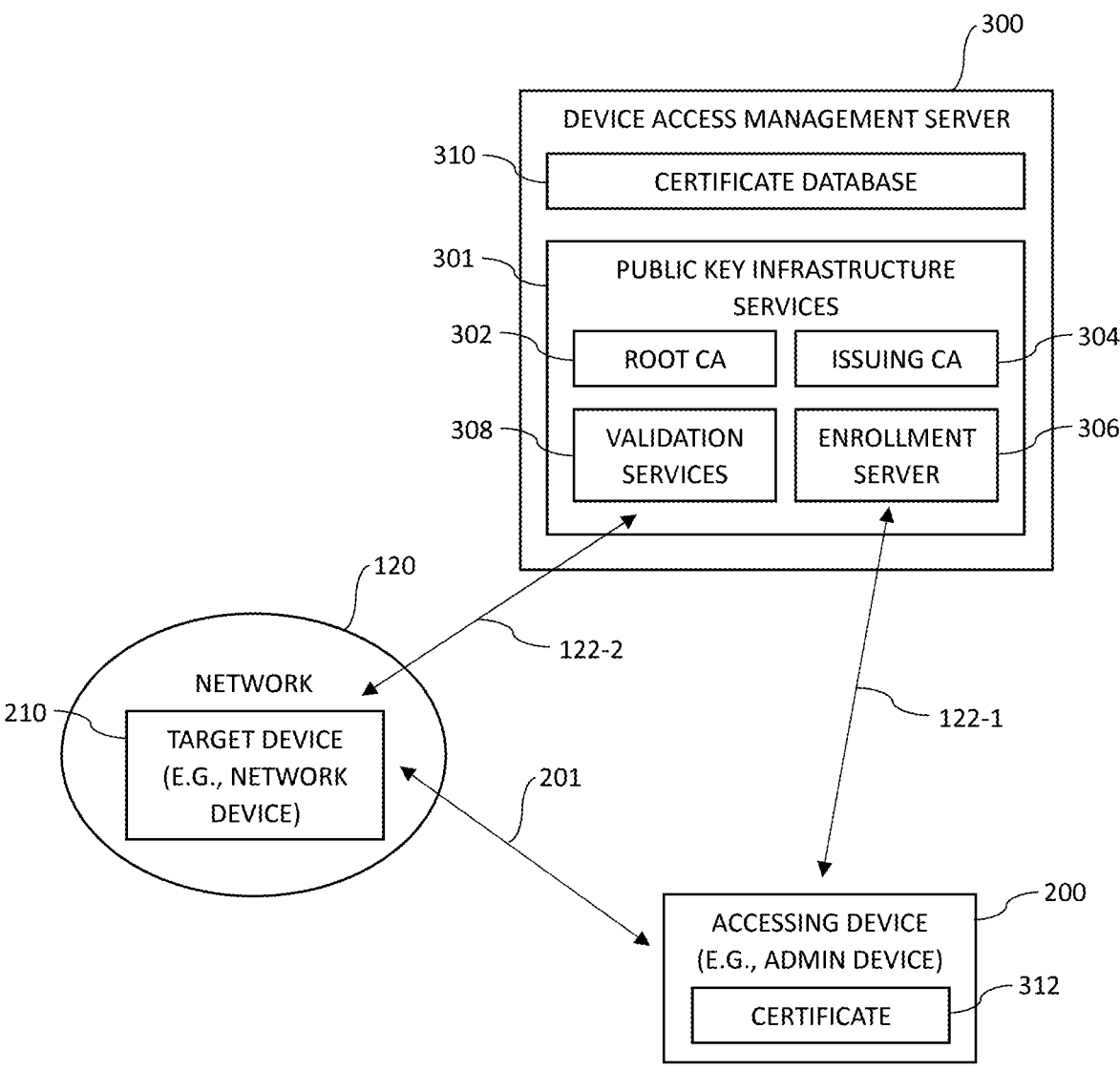
FIG. 3 is a diagram of an illustrative device access management server implementing public key infrastructure (PKI) services in accordance with some embodiments.

FIG. 3 is a diagram of an illustrative device access management server 300 configured to facilitate remote access of a target device and/or device administration of the target device by an accessing device. In configurations sometimes described herein, server 300 may form part of server 100 (FIG. 1) and may therefore be implemented using server equipment 102. Accordingly, the services and/or functions described in connection with server 300 may be performed by compute device(s) 104 executing corresponding (software) instructions stored on storage device(s) 106 and/or by other hardware of server equipment 102 having dedicated (e.g., fixed) functions. If desired, server 300 may be implemented separately from server 100. If desired, the services and/or functions described in connection with server 300 may be implemented in non-server-based implementations, e.g., implemented using local computing equipment accessible by devices 200 and/or 210 locally (e.g., on a local network).

Device access management server 300 may provide public key infrastructure (PKI) services 301 (e.g., executed using compute devices 104 and storage devices 106) and may maintain (e.g., create, store, delete or revoke, and/or otherwise update or manage) digital certificates (e.g., PKI certificates which are sometimes also referred to as public key certificates, digital certificates, identity certificates, or user identity certificates when containing user identity information). Server 300 may store these certificates in one or more certificate databases 310. In particular, the one or more PKI services 301 may include one or more certificate authorities such as a root certificate authority (CA) 302 and an issuing CA 304, may include enrollment server 306 (sometimes referred to as enrollment service 306), may include validation service(s) 308, and/or may include any other services or implement any other functions for supporting PKI operations (e.g., management of the life cycle of the certificates, management of public key encryption based on the certificates, etc.).

As part of PKI services 301, root CA 302 (and the root certificate of root CA 302) may be implicitly trusted (e.g., establish the root source of trust) and may issue certificates signed by root CA 302's private key, thereby establishing the root of the chain of trust to the entities to which root CA 302 issues these certificates. In the example of FIG. 3, root CA 302 may delegate the operation of issuing certificates to one or more issuing CAs 304 by issuing intermediate certificate(s) to CA(s) 304 signed by root CA 302's private key. In such a manner, root CA 302 may be offline (e.g., not actively issuing certificates), while issuing CA 304 issues certificates (signed by the issuing CA's private key) further down the chain of trust.

In configurations described herein as an illustrative example, the certificates issued by CA 304 may be user identity certificates issued to accessing devices 200 (e.g., administrator devices with the user identity being indicative of a network administrator). The use of root CA 302 and issuing CA 304 as described above is merely illustrative. If desired, these user identity certificates may be issued by any trusted CA (e.g., root CA 302, other CA further down the chain of trust from issuing CA 304, etc.).

Figure 4:
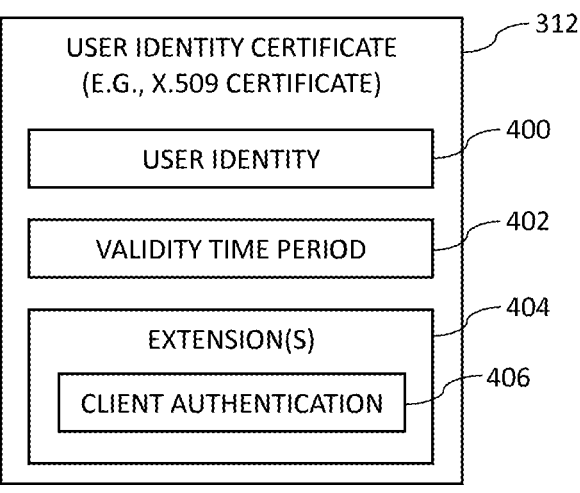
FIG. 4 is a diagram of an illustrative user identity certificate in accordance with some embodiments.

An example of a user identity certificate (e.g., certificate 312) is shown in FIG. 4. Certificate 312 as issued by the appropriate CA (e.g., issuing CA 304 in FIG. 3) may be a digital certificate or a public key certificate that contains a public key and that is cryptographically linked to the entity (e.g., the CA) that issued the certificate and the entity (e.g., administrator device and/or administrator) to which the certificate is issued. Configurations in which the user identity certificate (e.g., certificate 312) is an X.509 certificate (e.g., compliant or otherwise compatible with the International Telecommunications Union (ITU) X.509 standard) are sometimes described herein as an illustrative example.

In the example of FIG. 4, certificate 312 may include user identity information 400 that identifies or otherwise indicates a user (e.g., administrator) to which certificate 312 is issued. User identity information 400 may include the name of the entity (e.g., user) to which the certificate is issued, may include the public key bound to the entity, and/or may include any other types of information indicative of user identity. Certificate 312 may include certificate validity information such as one or more validity time periods 402 indicative of when certificate 312 is valid. As an example, validity time period(s) 402 may be specified using a time before which certificate 312 is valid and/or a time after which certificate 312 is valid.

Certificate 312 may also include one or more extensions 404 which can contain contextual information for certificate 312 (e.g., identifying a function or appropriate use of certificate 312). In illustrative configurations described herein as an example, an extension 404 may specify client authentication 406 as the purpose for certificate 312. While client authentication 406 is specified, other functions or uses for certificate 312 may be authorized as well based on the entity validating certificate 312 during use. In some examples described herein, certificate 312 for the purpose of client authentication 406 may similarly be used for device administration.

The information shown in certificate 312 of FIG. 4 is merely illustrative. Other types of information may (additionally) be included in certificate 312. As just a few examples, certificate 312 can include information such the version of X.509 standard applied to the certificate, the unique serial number provided by the issuing CA identifying the certificate, the (cryptographic) signing algorithm used by the issuing CA to sign the certificate, the name of the issuing CA, the CA digital signature signed (using the signing algorithm) by the CA's private key, etc.

Referring back to FIG. 3, certificate database 310 (e.g., stored on storage device(s) 106) may serve as storage for any issued certificates (e.g., any issued user identity certificates 312 of the type described in connection with FIG. 4). In particular, certificate database 310 may maintain a list of issued certificates (in one or more PKI domains) and the corresponding entity (e.g., user and/or user device) to which each certificate was issued, including the certificates establishing certificate chains (e.g., the chain of trust) such as the issuing CA certificates, root CA certificates, etc. The issuing CA (e.g. issuing CA 304) may write to or otherwise modify the list of issued certificates in database 310 (e.g., as new certificates are issued, as issued certificates are revoked, etc.). If desired, a registration authority (RA), in addition to or instead of the issuing CA, may write to or otherwise modify database 310. The RA may verify user requests for certificates (e.g., by performing user identity and/or authentication checks) and may thereafter communicate with the issuing CA to have the issuing CA issue the certificates (if user identity is successfully verified).

Enrollment server 306 implemented using a portion of the server equipment (e.g., server equipment 102) that implements server 300 may form at least part of the RA (e.g., may perform at least some of the functions of the RA as described above). In particular, enrollment server 306 may receive certificate generation requests from client devices and may verify the certificate generation requests and validate the inputs (e.g., user identity verification credentials) in the requests. In some configurations described herein as an example, enrollment server 306 may communicate with external equipment such as an identity provider system 132 (FIG. 1) to validate the inputs in the requests. In other configurations, the inputs may be validated locally on server 300 using locally stored information (e.g., a local directory stored on storage device(s) 106 for server 300).

In the example of FIG. 3, an accessing device 200 (e.g., a client device 118 of a network administrator in FIG. 1) may send a certificate generation request to enrollment server 306 via one of paths 122 (FIG. 1) such as communication path 122-1 (e.g., using HTTPS). The certificate generation request may include user login credentials or generally user identity verification credentials, or other user information verifiable (e.g., by enrollment server 306 and/or identity provider system 132) to authenticate the user's identity. As described herein sometimes as an illustrative example, enrollment server 306 may receive the request and may provide the user information in the request to identity provider system 132 for authentication. Once the user information in the request is authenticated by identity provider system 132, identity provider system 132 may provide an indication of successful authentication to enrollment server 306. Enrollment server 306 may communicate with the issuing CA to generate certificate 312 for the user and send certificate 312 to device 200. As examples, enrollment server 306 may communicate with each of the devices (including device 200) seeking a user identity certificate using a corresponding protocol such as the Simple Certificate Enrollment Protocol (SCEP), the Enrollment over Secure Transport (EST) protocol, the Automatic Certificate Management Environment (ACME) protocol, etc., to provide the devices with user identity certificates (e.g., certificate 312).

In such a manner, device 200 may obtain certificate 312 issued by issuing CA 304 after verification and validation of the certificate generation request by enrollment server 306 (and authentication of user information by identity provider system 132). Issuing CA 304 and/or enrollment server 306 may update database 310 to store the newly generated and issued certificate 312 (e.g., containing the user identity of the user of device 200, the validity information, and an indication that 312 is usable for client authentication and/or device administration).

Configurations in which certificate 312 is used to authenticate device 200 for device administration of a target device (e.g., a network device targeted for network administration) are sometimes described herein as an illustrative example. In particular, in some applications, it may be desirable for device 200 to have administrative access (e.g., an administrator-level access) to target device 210 (e.g., a network device 112 or other devices in network 120 of FIG. 1). Accordingly, device 200 may establish a connection (e.g., via communication path 201) to communicate with target device 210. Communication path 201 may include intervening devices (e.g., other network devices 112 in FIG. 1, devices in network 108, devices in network 102, supplemental equipment server 124, server 300, etc.) and/or may pass through one or more networks (e.g., the Internet, network 120, network 108, etc.), or may be a direct link (e.g., a wired link using an electrical or optical cable, or via a wireless communication link) without intervening devices.

Server 300 may provide (e.g., as part of PKI services 301) one or more validation services 308 to facilitate the validation of certificate 312. Validation service(s) 308 may form part of a validation authority (VA) and may validate received certificates such as certificate 312 (e.g., by checking the status of certificate 312 in database 310) from requesting devices. Upon determining that certificate 312 is valid (e.g., has not expired, has not been revoked, etc.), validation service 308 may communicate the result of validating the certificate with the request device (e.g., send an indication of a valid certificate in response to determining that the certificate is valid).

In the example of FIG. 3, target device 210, after receiving certificate 312 from device 200 in the access request, may transmit certificate 312 (e.g., as part of a certificate validation request) to validation service 308 in server 300 via one of paths 122 (FIG. 1) such as communication path 122-2 (e.g., using RADIUS or more specifically RadSec). Validation service 308 may help a target device such as device 210 validate a received user identity certificate. In particular, upon receiving certificate 312 in the validation request transmitted by target device 210, validation service 308 may perform a number of validation operations such as verifying that certificate 312 is valid based on the validity time period, checking that certificate 312 is not revoked in database 310, verifying all of the certificates in the certificate chain (e.g., the issuing and/or root CA certificates), etc.

Once validation service 308 verifies that certificate 312 is valid, validation server 308 may transmit a certificate validation reply to target device 200 via path 122. The reply may include an indication of successful certificate verification or validation. Based on the indication, target device 210 may grant administrative privileges to accessing device 200, thereby allowing device 200 to perform device administration of target device 210 (e.g., supply device 210 with configuration data, control signals, and/or other networking information via communication path 201, receive output such as performance metrics, log information, and/or other operational data from device 210 via communication path 201, etc.).

Figure 5:
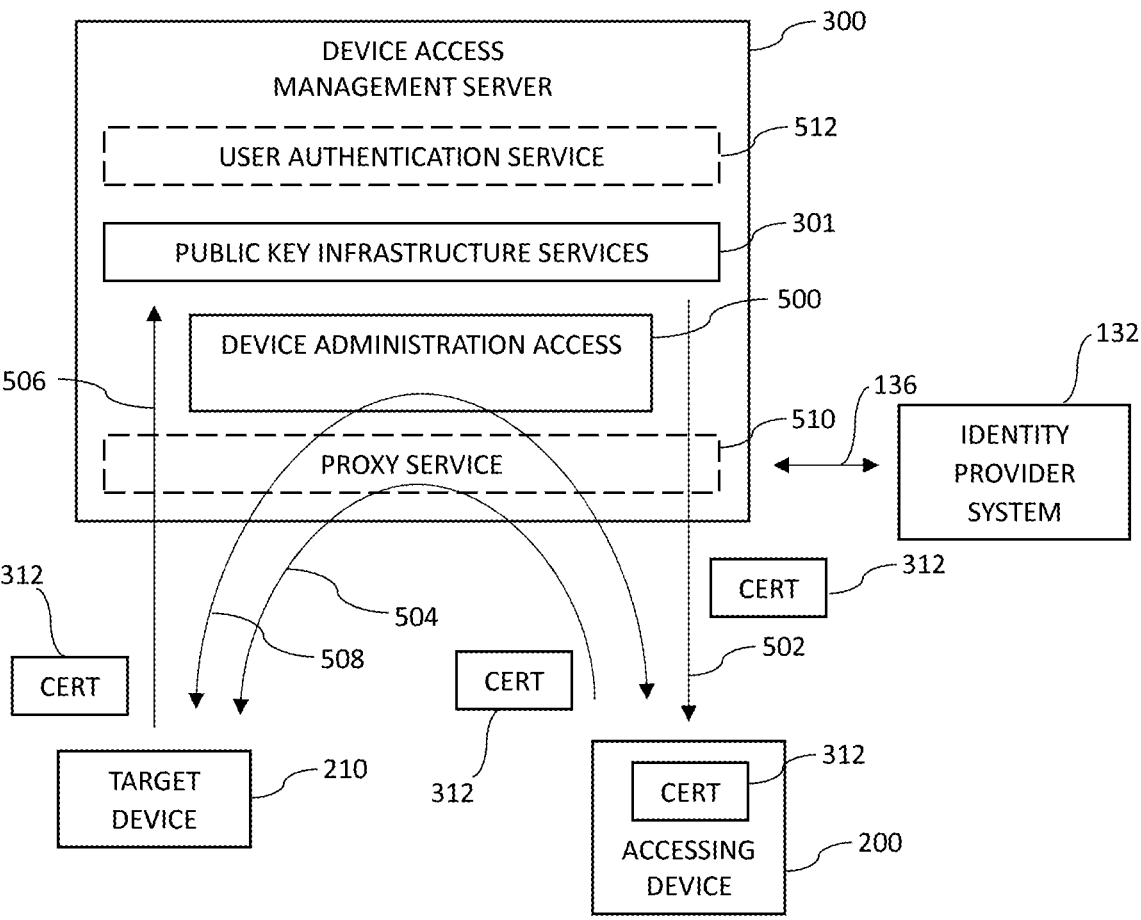
FIG. 5 is a diagram of one or more illustrative mechanisms for obtaining device administration access to a target device based on the conveyance of a certificate in accordance with some embodiments.

While, in some illustrative examples, the communication between accessing device 200 and target device 210 (e.g., using communication path 201) for requesting device administration access and performing device administration may occur separately from server 300, in other illustrative examples, it may be desirable to configure server 300 to further facilitate the device administration access process (e.g., in addition to distributing certificate 312 to device 200 and validating certificate 312 received from device 210). FIG. 5 is a diagram of an illustrative device access management server such as server 300 configured to provide device administration access services and/or provide external authentication of user identity, e.g., in addition providing PKI services (e.g., services 301 described in connection with FIG. 3).

As similarly described in connection with FIG. 3, server 300 in FIG. 5 may include provide PKI services 301 (e.g., enrollment server 306, issuing CA 304, etc.) configured to send a user identity certificate such as certificate 312 to accessing devices 200 after successful authentication of the user identity of accessing device 200. In the example of FIG. 5, server 300 may be communicatively coupled to identity provider system 132 (FIG. 1) such as an identity provider server that performs authentication of user identity based on user login credentials and/or other verifiable user identity information. PKI services 301 (e.g., enrollment server 306) may use identity provider system 132 to authenticate any user information (e.g., user login credentials, verifiable user identity information) received from accessing device 200. In other words, these types of verifiable user identity information may be forwarded to an external identity provider system 132 via communication path 136. In other instances, device 200 may communicate the user identity information directly to system 132 via server 300 (e.g., server 300 may provide a portal that redirects device 200 to identity provider system 132 such that user login credential information can be input at device 200 and received directly by system 132). External identity provider system 132 may provide an indication of successful (or in other scenarios unsuccessful) authentication of user identity based on the forwarded user identity information via communication path 136 to PKI services 301 (e.g., enrollment server 306). Based on this indication (e.g., indicative of successful authentication), PKI services 301 may generate, store (in database 310), and distribute (to device 200) certificate 312 (as indicated by arrow 502).

To facilitate later retrieval and use of certificate 312, server 300 may cause device 200 to store certificate 312 locally at a location and/or in a manner known to server 300 (e.g., at a location on memory circuitry 206 selected by and therefore known to server 300, by a certificate file name selected by and therefore known to server 300, etc.). Doing so may allow a device administration access service 500 (sometimes referred to as device administration access application 500) executing on server 300 to retrieve certificate 312 from accessing device 200 to include in a device administration access request conveyed to target device 210, when appropriate (e.g., when device 200 requests for access to target device 210 via server 300).

In some illustrative configurations, device 200 may receive user input (e.g., via input-output circuitry 208 in FIG. 2) to initiate a device administration session with target device 210 using server 300. In particular, device 200 (e.g., processing circuitry 204 in FIG. 2) may execute a web browser application (or other types of application) through which device 200 communicates with server 300. The user (e.g., the network administrator) may initiate the device administration session using a user interface implemented on device 300 (e.g., provided with input-output circuitry 208 such as a display, a mouse or trackpad, a keyboard, etc., and/or provided in connection with the web browser application and/or other software applications executing on processing circuitry 204, etc.).

In connection with the initiation, accessing device 200 may communicate with server 300 (or more specifically device administration access service 500) to transmit a device access request (e.g., requesting administrative access to perform device administration) to target device 210 (e.g., through server 300). Based on the communication, server 300 may retrieve certificate 312 locally stored on device 200 for inclusion within the request (generated by server 300), or may instruct or otherwise cause device 200 to generate the access request to include certificate 312 therein. Accordingly, certificate 312 may be conveyed (e.g., as part of the access request) from device 200 via server 300 to target device 210, as indicated by arrow 504.

Upon receiving the access request containing certificate 312, target device 210 (e.g., processing circuitry 214 in FIG. 2) may process the access request to obtain certificate 312. Relying on server 300 for certificate validation, target device 210 (e.g., processing circuitry 214) may generate a certificate validation request that includes certificate 312 based on processing the access request. Device 210 (e.g., processing circuitry 214) may transmit, e.g., using input-output interfaces 220 in FIG. 2) the certificate validation request to server 300. Upon receiving the certificate validation request, PKI services 301 (e.g., validation service 308) may make a determination on the validity of certificate 312 in the request (e.g., in the same manner as described in connection with FIG. 3). Upon determining that certificate 312 is valid, validation service 308 may provide an indication of certificate 312 being valid to device 210 (e.g., by sending a certificate validation reply to device 210 that is responsive to the request).

Upon receiving the certificate validation reply (e.g., using input-output interfaces 220), device 210 (e.g., processing circuitry 214) may make a determination (e.g., based on the reply containing an indication of valid certificate 312) to permit (administrative) access to device 210 (by device 200). Device 210 may transmit an indication of this determination to permit access to server 300 (and/or device 200). Accordingly, service 500, based on receiving and processing the indication to permit access, may establish a communication path 508 (e.g., an illustrative implementation of communication path 201 in FIGS. 2 and 3) between device 200 and target device 210. Device 200 and device 210 may exchange messages therebetween via path 508 to perform device administration.

In order to facilitate certain operations and provide a more seamless user experience, server 300 may include a proxy service 510 that provides an interface through which requests, replies, and/or other messages to and from server 300 are passed to and/or from the appropriate entity (e.g., the appropriate service on server 300, identity provider system 132, device 200, device 210, etc.) without necessarily exposing these entities to the user of device 200, as an example. As examples, proxy service 510 of server 300 may fetch and forward certificate 312 (stored locally on device 200) to device 210 when device 200 is requesting access to target device 210 through server 300, the user of device 200 can access target device 210 for network administration through proxy service 510 after access is permitted by device 210.

If desired, server 300 may provide a user authentication service such as user authentication service 512 locally and may therefore authenticate the user's identity internally (prior to distributing certificate 312). When implemented internally, service 512 may access a locally stored user database (e.g., a user directory stored on storage devices 106 for server 300) to perform the verification of received user identity information (e.g., user login credentials). Server 512 may be provided instead of or in addition to a communicative coupling to external identity provider system 132.

The services and/or servers provided by device access management server 300 (e.g., as described in connection with FIGS. 3 and 5) may generally be implemented using compute devices 104 executing (software) instructions stored on storage devices 106. While various services and servers of server 300 having corresponding functions are described herein, these functions may generally be performed by processing circuitry (e.g., one or more compute devices 104) and storage circuitry (storage devices 106) of server equipment (e.g., server equipment 102) when implementing these functions and/or other functions in any suitable combination.

Figure 6:
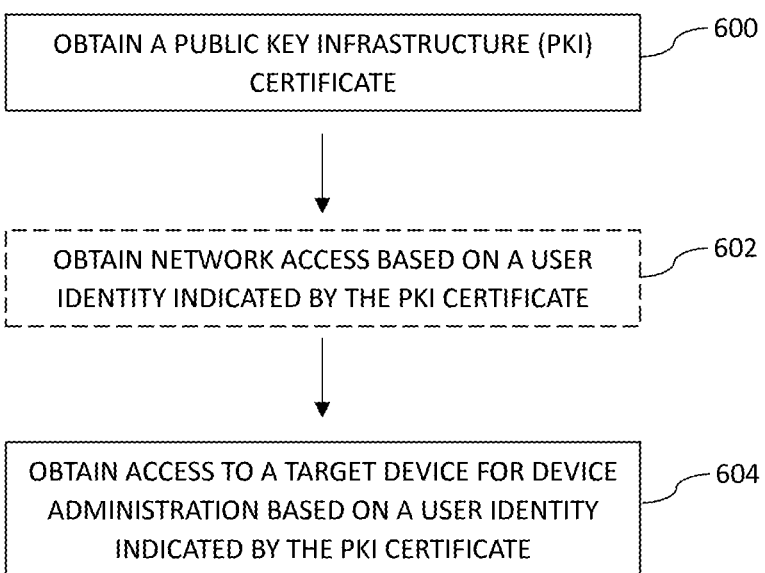
FIG. 6 is a flowchart of illustrative operations for performing device administration based on a PKI certificate in accordance with some embodiments.

FIG. 6 is a flowchart of illustrative operations for operating a networking system to facilitate access to a target device by an accessing user device based on PKI certificates. Configurations in which access to the target device facilitates device administration are sometimes described herein as examples. If desired, access to the target device may facilitate other operations.

The operations of FIG. 6 are sometimes described in connection with the networking system of FIG. 1, the networking system of FIG. 3, and/or the networking system of FIG. 5. If desired, these operations may be performed by elements in other types of networking systems.

More specifically, these operations may be performed with the processing circuitry of server 100 in FIG. 1 implemented using compute devices 104 or more specifically the processing circuitry of server 300 in FIGS. 3 and 5 (which may be implemented as part of server 100), processing circuitry 204 of accessing device 200 in FIG. 2, and/or processing circuitry 214 of target device 210 in FIG. 2. The illustrative operations described in connection with FIG. 6 may generally be performed by the corresponding processing circuitry of the device or system (e.g., compute devices 104 or corresponding compute devices of server 300 (if implemented separately from server 100), processing circuitry 204, and processing circuitry 214) by executing software instructions stored on the corresponding memory circuitry of the device or system (e.g., storage devices 106 or corresponding storage devices of server 300 (if implemented separately from server 100), memory circuitry 206, and memory circuitry 216). If desired, one or more operations described in connection with FIG. 6 may be performed by other dedicated hardware components in server 100 or server 300, device 200, and/or device 210.

At block 600, processing circuitry of a user device (e.g., device 200) may obtain (e.g., receive) a PKI certificate or generally a user identity certificate containing user identity information of the user of the user device. As an example, processing circuitry of a server (e.g., device access management server 300) may obtain (e.g., generate) the certificate based on successfully verifying the user identity of user device 200 (e.g., using an internal user identity authentication server or using an external identity provider system). The processing circuitry of the server may distribute (e.g., using input-output interfaces of the server) the certificate such that the processing circuitry of the user devices receives the certificate. The processing circuitry of the user device may store the certificate on memory circuitry of the user device (e.g., as a location known to and/or accessible by the processing circuitry of server 300). In general, any suitable operations performed by server 300 and devices 200 and 210 as described in connection with FIGS. 3 and 5 for obtaining PKI certificates may be performed at block 600.

In some illustrative configurations described herein as an example, certificate 312 may be usable to authenticate network access of the network to which device 200 is connected (e.g., access of network 120 in FIG. 1 by device 200), in addition to being usable authenticate administrative access to a target device for device administration. While some users may have (e.g., their issued certificates may indicate) administrative access to devices 210 for device administration in addition to access to network 120, other users may have (e.g., their issued certificates may indicate)

access to network 120 without administrative access to devices 210. Different sets of users (e.g., users having different levels of administrative access and/or having different types of network access) may have administrative access to different sets of target devices and/or may have access to different portions of network 120. This type of information may be indicated by the user identity information (e.g., information 400 in FIG. 4) in certificate 312 or otherwise determined based on the user identity information in certificate 312.

Accordingly, at block 602, the processing circuitry of the user device may obtain network access based on a user identity indicated by the (PKI) certificate (e.g., user identity information 400 in certificate 312). As an example, the processing circuitry of the user device may provide the PKI certificate to an access layer network device (e.g., a network access switch or another network device in network 120) to authenticate its network access to the network (e.g., network 120). Upon successful network access authentication (e.g., based on the processing circuitry of the server validating the certificate as received from the access layer network device), the processing circuitry of the user device may obtain network access.

At block 604, the processing circuitry of the user device may obtain access to a target device for device administration based on a user identity indicated by the (PKI) certificate (e.g., user identity information 400 in certificate 312). As an example, the processing circuitry of the server (e.g., device access management server 300) may obtain the certificate from the target device and may validate the certificate and provide the target device with an indication that the certificate is valid. Accordingly, the target device may grant administrative access to the user device, thereby allowing the processing circuitry of the user device to obtain access to the target device for device administration. If desired, the processing circuitry of the server may also facilitate the sending of the access request containing the certificate to the target device and/or establish the communication path between the user device and the target device to facilitate communications for performing device administration. In general, any suitable operations performed by server 300 and devices 200 and 210 as described in connection with FIGS. 3 and 5 for obtaining device administration access may be performed at block 604.

Figure 7:
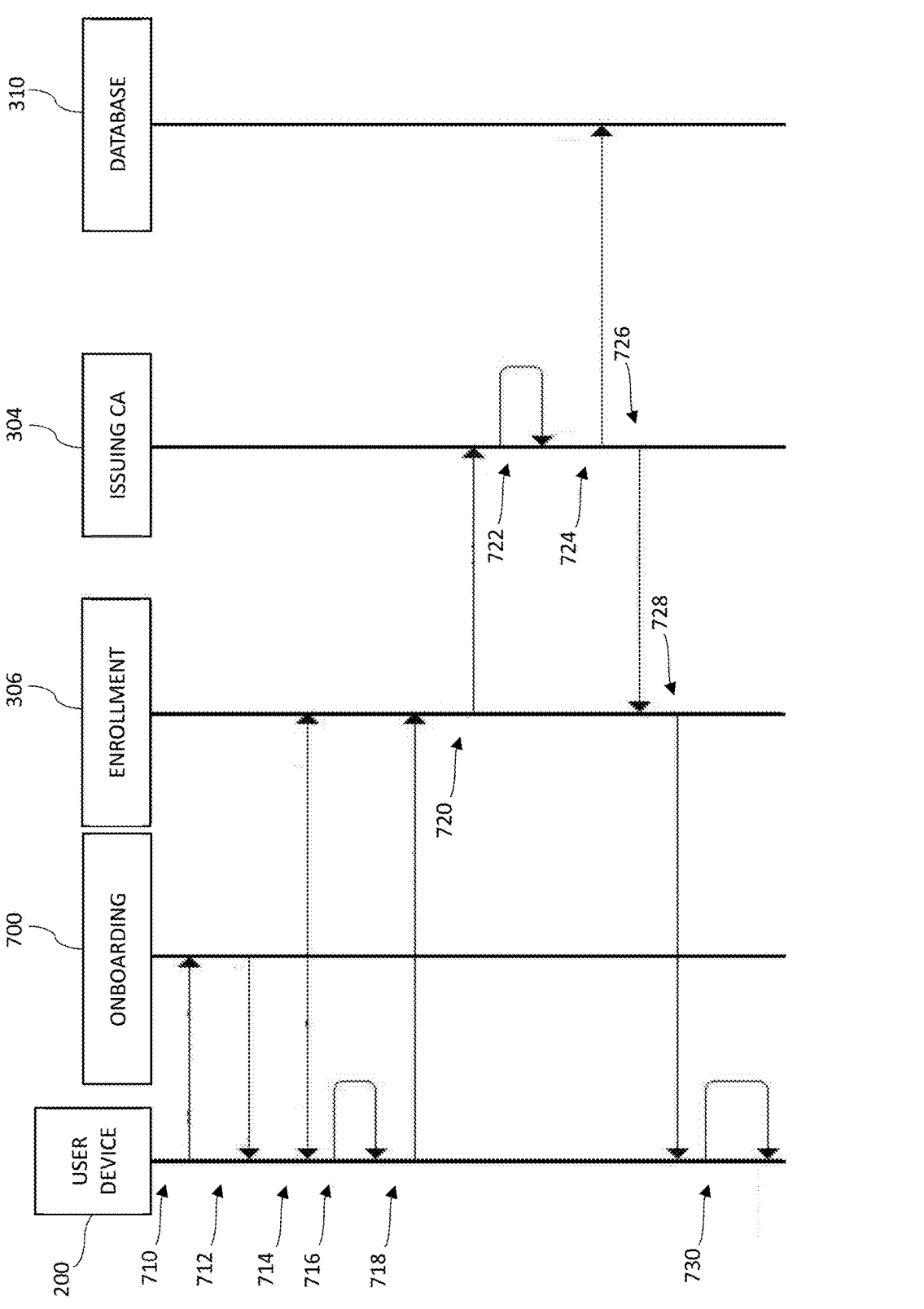
FIG. 7 is a diagram of an illustrative protocol for obtaining a certificate for a user device in accordance with some embodiments.

FIG. 7 is a flowchart of an illustrative protocol for obtaining a user identity certificate. This protocol is merely illustrative. If desired, other protocols or schemes may be used instead. If desired, the operations described in connection with FIG. 7 may be performed as part of block 600 of FIG. 6. The operations of FIG. 7 are sometimes described in connection with the networking system of FIG. 1, the networking system of FIG. 3, and/or the networking system of FIG. 5. If desired, these operations may be performed by elements in other types of networking systems.

As shown in FIG. 7, the networking system may include a user device (e.g., user device 200 in FIG. 5) seeking to obtain a user identity certificate, may include an onboarding entity 700 (e.g., an onboarding service or server), and may include an enrollment entity (e.g., enrollment server 306), an issuing CA (e.g., issuing CA 304), and a database (e.g., certificate database 310). The onboarding entity may be implemented locally as part of or along with user authentication service 512 on server 300, or may be implemented by an external server (e.g., by identity provider system 132). Onboarding entity 700 and enrollment server 306 may communicate with user device 200 (e.g., belonging to a network administrator) to facilitate user onboarding and user certificate generation.

The operations described in connection with FIG. 7 may be performed with the processing circuitry of server 100 in FIG. 1 implemented using compute devices 104 or more specifically the processing circuitry of server 300 in FIGS. 3 and 5 (which may be implemented as part of server 100), and/or processing circuitry 204 of accessing device 200 in FIG. 2. The illustrative operations described in connection with FIG. 7 may generally be performed by the corresponding processing circuitry of the device or system (e.g., compute devices 104 or corresponding compute devices of server 300 (if implemented separately from server 100), and processing circuitry 204) by executing software instructions stored on the corresponding memory circuitry of the device or system (e.g., storage devices 106 or corresponding storage devices of server 300 (if implemented separately from server 100), and memory circuitry 206). If desired, one or more operations described in connection with FIG. 7 may be performed by other dedicated hardware components in server 100 or server 300 and/or device 200.

The onboarding and enrollment process may begin with a request transmitted from device 200 and received by onboarding entity 700 for onboarding user device 200 and its user into a system directory or user identity database (with operation 710). Responsive to the request, onboarding entity 700 (e.g., system 132) may generate and store a network profile of the user (e.g., containing user information relevant to the network such as user identity information indicative of administrative access or other user privilege information) in the database and may return an indication of successful onboarding (with operation 712).

After user onboarding, user device 200 may begin the certificate enrollment process (e.g., to obtain a certificate for the user) by establishing a connection with enrollment server 306 (with operation 714). With operation 716, user device 200 may generate the user's private key (e.g., as a key pair of the public key of user device 200) and create a Certificate Signing Request (CSR) containing the public key of the user along with other details associated with the user. With operation 718, user device 200 may transmit the CSR to enrollment server 306 (e.g., as part of a certificate generation request).

When the identity of the user is verified (e.g., based on comparing received user identity information with the onboarding information described in connection with operations 710 and 712, as described in connection with FIGS. 3 and 5, etc.), the process may proceed to operation 720. With operation 720, enrollment server 306 may send a certificate issuance request to issuing CA 304. The certificate issuance request may include the CSR in the payload of the issuance request. With operation 722, issuing CA 1904 may perform validation checks on the CSR in the payload (e.g., checking the format and/or the content of the CSR). If desired, enrollment server 306 may perform one or more of these validation checks (instead of or in addition to issuing CA 304) prior to sending the certificate issuance request to issuing CA 304. After validating the CSR, issuing CA 304 may sign the CSR, issue the corresponding certificate (e.g., certificate 312) for device 200 and the user of device 200, and store the certificate in certificate database 310 (with operation 724).

With operation 726, issuing CA 304 may send the issued certificate to enrollment server 306. With operation 728, enrollment server 306 may forward the issued certificate to user device 200. Thereafter, device 200 may install (e.g., store) the issued certificate along with its private key for future use (e.g., for authenticating access to a network device for device administration, for authenticating access to a wireless network portion and/or other portions of network 120, etc.).

FIG. 8 is a flowchart of how a target device (e.g., a network device) can validate a received user identity certificate and provide the requesting device with access for device administration. If desired, the operations described in connection with FIG. 8 may be performed as part of block 604 of FIG. 6. The operations of FIG. 8 are sometimes described in connection with the networking system of FIG. 1, the networking system of FIG. 3, and/or the networking system of FIG. 5. If desired, these operations may be performed by elements in other types of networking systems.

More specifically, these operations may be performed with the processing circuitry of server 100 in FIG. 1 implemented using compute devices 104 or more specifically the processing circuitry of server 300 in FIGS. 3 and 5 (which may be implemented as part of server 100), processing circuitry 204 of accessing device 200 in FIG. 2, and/or processing circuitry 214 of target device 210 in FIG. 2. The illustrative operations described in connection with FIG. 8 may generally be performed by the corresponding processing circuitry of the device or system (e.g., compute devices 104 or corresponding compute devices of server 300 (if implemented separately from server 100), processing circuitry 204, and processing circuitry 214) by executing software instructions stored on the corresponding memory circuitry of the device or system (e.g., storage devices 106 or corresponding storage devices of server 300 (if implemented separately from server 100), memory circuitry 206, and memory circuitry 216). If desired, one or more operations described in connection with FIG. 8 may be performed by other dedicated hardware components in server 100 or server 300, device 200, and/or device 210.

At block 800, processing circuitry of a target device (e.g., target device 210) may receive a request for administrator access to the target device from an accessing device such as accessing device 200 (e.g., via server 300). The request may include a PKI certificate associated with the user of device 200 such as certificate 312 (e.g., generated based on the operations of FIG. 7).

At block 802, the processing circuitry of the target device may generate and send a certificate validation request to processing circuitry of a server (e.g., server 300) for implementing a validation service (e.g., validation service 308). The certificate validation request may request a status (e.g., indicative of certificate validity) of the PKI certificate received from the accessing device.

At block 804, the processing circuitry of the server may receive and verify the status of the PKI certificate using a certificate database (e.g., database 310 containing information indicative of whether or an issued certificate is valid).

At block 806, the processing circuitry of the server may send (e.g., via input-output interfaces of the server) a validation response (or reply) to the processing circuitry of the target device. At block 808, the processing circuitry of the target device may receive (e.g., via input-output interfaces 220) and process the validation response from the processing circuitry of the server.

At block 810, the processing circuitry of the target device may provide, in response to the PKI certificate being valid based on the validation response, the accessing device with access to the network device for network administration (e.g., device administration such as device configuration).

The methods and operations described above in connection with FIGS. 1-8 may be performed by the components of one or more network devices, one or more computing devices, and/or one or more servers or other host equipment using software, firmware, and/or hardware (e.g., dedicated circuitry or hardware). Software code for performing these operations may be stored on one or more non-transitory computer-readable storage media (e.g., tangible computer readable storage media) on one or more of the components of the network device(s), the computing device(s), and/or the server(s) or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s), the computing device(s) and/or the server(s) or other host equipment (e.g., processing circuitry of server 100, processing circuitry 204 of device 200, processing circuitry 214 of device 210, processing circuitry of server 300, etc.).

The foregoing is merely illustrative and various modifications can be made to the described embodiments. The foregoing embodiments may be implemented individually or in any combination.

What is claimed is:

1. A method of operating server equipment that provides public key infrastructure services to facilitate access of a target device by an accessing device for performing device administration, the method comprising:

receiving, from the accessing device, a certificate generation request;

providing, to the accessing device and based on the certificate generation request, a public key certificate containing user identity information for the accessing device;

receiving, from the target device, the public key certificate, the received public key certificate being a version of the provided public key certificate obtained by the target device in an access request for performing device administration;

validating the received public key certificate; and providing, to the target device, an indication of the received public key certificate being valid, wherein the target device is configured to provide access to the accessing device for performing device administration based on the indication.

2. The method defined in claim 1 further comprising:

authenticating a user identity of the accessing device based on the received certificate generation request, wherein the public key certificate is provided to the accessing device based on the user identity being successfully authenticated.

3. The method defined in claim 2, wherein authenticating the user identity of the accessing device comprises providing, to an external identity provider server, verifiable user identity information and receiving, from the external identity provider server, an indication of successful authentication.

4. The method defined in claim 1 further comprising:

maintaining the provided public key certificate in a certificate database, wherein the received public key certificate is validated at least in part by using the certificate database.

5. The method defined in claim 4, wherein the received public key certificate is validated based on checking whether the received public key certificate has been revoked and whether the received public key certificate has expired.

6. The method defined in claim 1 further comprising:

receiving, by the server equipment and from the accessing device, an indication to request access to the target device for performing device administration; and providing, by the server equipment to the target device, the access request for performing device administration.

7. The method defined in claim 6 further comprising:

establishing a communication path through the server equipment between the accessing device and the target device after the target device has granted access to the accessing device.

8. The method defined in claim 1, wherein the public key certificate is usable by the accessing device to authenticate network access and is usable by the accessing device to gain administrative access to the target device.

9. The method defined in claim 8, wherein the public key certificate comprises an extension that includes an indication of client authentication.

10. The method defined in claim 9, wherein the public key certificate comprises a validity time period.

11. The method defined in claim 1, wherein the accessing device is an administrator device, wherein the user identity information is indicative of administrator-level access for the administrator device, and wherein the target device is a network device.

12. The method defined in claim 1, wherein performing device administration comprises the accessing device supplying the target device with configuration data, the accessing device supplying the target device with a control signal, the accessing device supplying the target device with networking information, the accessing device receiving performance metrics from the target device, the accessing device receiving log information from the target device, or the accessing device receiving operational data from the target device.

13. A method of operating an accessing device to obtain access to a target device for device administration, the method comprising:

sending, to a device access management server, a certificate generation request;

receiving, from the device access management server, a public key certificate containing user identity information for the accessing device;

storing, on memory circuitry of the accessing device, the received public key certificate; and requesting, using the stored public key certificate, access to the target device for device administration, wherein the target device is a network device that forwards network traffic between hosts and wherein requesting access to the target device for device administration comprises sending, to the network device, an access request that includes the stored public key certificate.

14. The method defined in claim 13 further comprising:

providing user login credentials for authentication by an identity provider system, wherein the public key certificate is received after the user login credentials have been successfully authenticated.

15. The method defined in claim 13, wherein the network device is a multi-layer switch.

16. The method defined in claim 13, wherein the access request is sent to the network device using the device access management server.

17. A method of operating a target device to provide access to an accessing device for device administration, the method comprising:

receiving, by the target device, an access request by the accessing device for device administration, the access request containing a public key certificate;

sending, to a device access management server, a certificate validation request containing the public key certificate;

receiving, from the device access management server, an indication of the public key certificate being valid; and providing access for device administration to the accessing device based on the indication of the public key certificate being valid.

18. The method defined in claim 17, wherein the access request is received from the accessing device via the device access management server.

19. The method defined in claim 18, wherein providing access for device administration to the access device comprises transmitting or receiving information through a communication path through the device access management server between the target device and the accessing device.

20. The method defined in claim 17, wherein the target device is a network device and wherein the public key certificate is indicative of a user identity having administrator-level access.

* * * * *